I. F. Colby.
Coffee Mill.
Nº 78,648. Patented Jan. 9, 1868.

Witnesses.
D. C. Colby
Edw. F. Brown

Inventor.
I. Fremont Colby

United States Patent Office.

I. FREMONT COLBY, OF WASHINGTON, DISTRICT OF COLUMBIA, ASSIGNOR TO HIMSELF AND DANIEL C. COLBY, OF SAME PLACE.

Letters Patent No. 78,648, dated June 9, 1868.

IMPROVEMENT IN COFFEE-MILLS.

*The Schedule referred to in these Letters Patent and making part of the same.*

TO WHOM IT MAY CONCERN:

Be it known that I, I. FREMONT COLBY, of the city of Washington, District of Columbia, have invented new and useful Improvements in Coffee-Mills; and I do hereby declare the following to be a full and exact description of the same, reference being had to the drawings that accompany and form a part of these specifications, in which—

Figure 1:
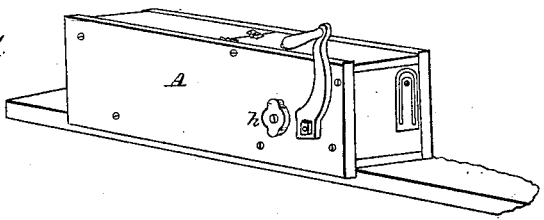

Figure 1 is a perspective view of the mill in position for the grinding.

Figure 2:
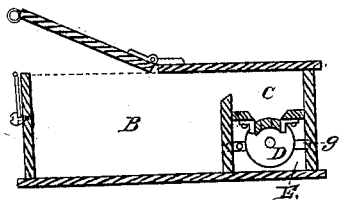

Figure 2, longitudinal vertical section, showing arrangement of interior parts.

Figure 3:
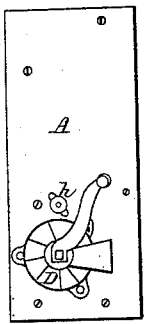

Figure 3, view of front of mill as it would stand at rest.

Figure 4:
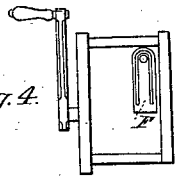

Figure 4, end view, with arrangement for pouring out the ground coffee.

Figure 5:
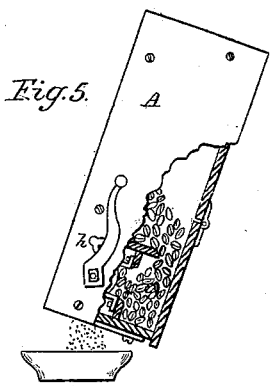

Figure 5, view of mill in position for discharging the ground coffee. In this view a portion of the front is broken away, representing how the small chamber or hopper is supplied from the larger chamber or reservoir B.

Letter A, box, containing chambers for the unground coffee, as also receptacle for the ground coffee.

Letter B, a supply-chamber or reservoir, to contain a pound or two, or more, of the roasted berries.

Letter C, a smaller chamber, also for the unground coffee, and may be called the hopper, as the berries are fed from this to the grinding parts.

Letter D, grinding-device, and may be within the box A, as represented in fig. 2, or it may be on the outside of the box A, as appears in fig. 3.

Letter E, chamber, for receiving the ground coffee.

Letter F, swing-plate, beneath which is the opening for pouring out the ground coffee.

Letter g, a lever, being across just in the rear of the grinding parts, as may be seen in fig. 2. To the left-hand end of this is attached a wire, extending frontwards through the side of the box A, bearing the thumb-nut h. By this nut the mill is regulated to grind coarser or finer, as one may desire.

Fig. 2 exhibits the top of the reservoir or box A divided, and one part of it hinged. This affords opportunity for filling the box.

The object of my invention is to provide a coffee-mill that may be convenient to use without requiring to be nailed up or permanently attached, one that can be easily held on the side of the table, as in fig. 1, or in the lap, or on the knee.

And, further, to so combine a reservoir for containing a considerable quantity of the roasted coffee-berries that they may be supplied to the hopper of the mill as required without any exposure to the air, in order that the aroma of the coffee may be much better preserved than when the canister is opened every time a little is ground.

Also to have the mill always closed, so as to be free from flies, spiders, roaches, and the like.

The grinding parts may well be made of chilled cast iron.

For common family size, I make the wooden box A from ten to twelve inches in length, five to six inches from top to bottom when standing, as in fig. 1, and three to four inches wide.

Chamber C holds only a small portion of the unground coffee, but as the box is turned up, as in fig. 5, to pour out a quantity of ground coffee, the hopper C will be replenished from the larger chamber B.

This arrangement of the two chambers, one by the side of the other, gives larger base and less height than to arrange one over the other, and thus the steadiness, or easy holding of my mill, which is a very noticeable feature.

When setting the mill away on the shelf, it may be in position, as in fig. 1, fig. 3, or fig. 4, and thus is suited to almost any space into which it may be convenient to put it.

The coffee being always kept perfectly dry and free from the air, is always in good condition for grinding, and has all its delicious aroma preserved.

The box A, or any portions thereof, may be made of metal instead of wood, if desired.

What I claim as of my invention, and desire to secure by Letters Patent, is—

Providing the coffee-mill with a supply-reservoir, B, in combination with the smaller chamber C, and chamber E, all arranged for the purposes specified and set forth.

In testimony whereof, I have signed my name to this specification in the presence of two subscribing witnesses.

I. FREMONT COLBY.

Witnesses:
EDM. F. BROWN,
D. C. COLBY.